(12) United States Patent
Doucet et al.

(10) Patent No.: US 11,701,578 B2
(45) Date of Patent: Jul. 18, 2023

(54) INFORMATION PROCESSING APPARATUS AND CONTROL METHOD FOR CONTROLLER APPARATUS

(71) Applicant: Sony Interactive Entertainment Inc., Tokyo (JP)

(72) Inventors: Nicolas Doucet, Yokohama (JP); Hideyuki Uchida, Ibaraki (JP); Naoyuki Saito, Tokyo (JP); Tomohito Ito, Kanagawa (JP); Eric Bailey, Tsukuba (JP); Masayuki Yamada, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/258,780

(22) PCT Filed: Jul. 2, 2019

(86) PCT No.: PCT/JP2019/026348
§ 371 (c)(1),
(2) Date: Jan. 8, 2021

(87) PCT Pub. No.: WO2020/013039
PCT Pub. Date: Jan. 16, 2020

(65) Prior Publication Data
US 2021/0268370 A1    Sep. 2, 2021

(30) Foreign Application Priority Data
Jul. 12, 2018  (JP) .............................. JP2018-132655

(51) Int. Cl.
*A63F 13/24*  (2014.01)
*A63F 13/21*  (2014.01)
(Continued)

(52) U.S. Cl.
CPC .............. *A63F 13/24* (2014.09); *A63F 13/21* (2014.09); *G05G 9/047* (2013.01); *G06F 3/16* (2013.01); *G05G 2009/04762* (2013.01)

(58) Field of Classification Search
None
See application file for complete search history.

(56) References Cited

U.S. PATENT DOCUMENTS 8,306,768 B2   11/2012 Yamada
8,441,442 B2    5/2013 Sato
(Continued)

FOREIGN PATENT DOCUMENTS

JP   2008276615 A   11/2008
JP   2009061161 A    3/2009
(Continued)

OTHER PUBLICATIONS

International Preliminary Report on Patentability and Written Opinion for corresponding PCT Application No. PCT/JP2019/026348, 13 pages, dated Jan. 21, 2021.

(Continued)

*Primary Examiner* — Peter J Iannuzzi
(74) *Attorney, Agent, or Firm* — Matthew B. Dernier, Esq.

(57) ABSTRACT

The information processing apparatus is connected to a controller apparatus provided with a push button which moves from a first position to a second position by being pushed by a user's finger. The information processing apparatus acquires the push-in amount of the push button of the controller apparatus, determines whether or not the push-in amount is in a range that excludes the first position and the second position and is configured by two threshold values (Continued)

set between the first position and the second position, and performs predetermined processing on the basis of the result of the determination.

6 Claims, 2 Drawing Sheets

(51) Int. Cl.
*G05G 9/047* (2006.01)
*G06F 3/16* (2006.01)

(56) References Cited

U.S. PATENT DOCUMENTS

| | | | |
|---|---|---|---|
| 8,686,939 B2* | 4/2014 | Mao | A63F 13/06 |
| | | | 345/158 |
| 2001/0023205 A1* | 9/2001 | Kikukawa | A63F 13/42 |
| | | | 463/37 |
| 2006/0234794 A1* | 10/2006 | Baseflug | A63F 13/06 |
| | | | 463/37 |
| 2007/0227256 A1* | 10/2007 | Wright | G01L 1/142 |
| | | | 73/780 |
| 2007/0281787 A1 | 12/2007 | Numata | |
| 2008/0274813 A1 | 11/2008 | Sato | |
| 2010/0160045 A1 | 6/2010 | Yamada | |
| 2012/0287043 A1 | 11/2012 | Yamada | |
| 2013/0023341 A1 | 1/2013 | Yamanouchi | |
| 2015/0130706 A1* | 5/2015 | Lacroix | A63F 13/54 |
| | | | 345/156 |
| 2016/0260261 A1* | 9/2016 | Hsu | B23K 9/0953 |
| 2016/0363996 A1 | 12/2016 | Higgins | |
| 2017/0361217 A1 | 8/2017 | Burdea | |
| 2018/0053337 A1* | 2/2018 | Nakashima | G06F 3/017 |
| 2018/0067545 A1* | 3/2018 | Provancher | G06F 3/011 |
| 2019/0318640 A1* | 10/2019 | Goel | G02B 27/017 |

FOREIGN PATENT DOCUMENTS

| | | |
|---|---|---|
| JP | 2010142561 A | 7/2010 |
| JP | 2011083461 A | 4/2011 |
| JP | 2018014109 | 1/2018 |
| JP | 2018036942 A | 3/2018 |
| WO | 2016186041 A1 | 11/2016 |
| WO | 2017061178 A1 | 4/2017 |
| WO | 2018016107 | 1/2018 |

OTHER PUBLICATIONS

International Search Report for corresponding PCT Application No. PCT/JP2019/026348, 3 pages, dated Aug. 6, 2019.
Notice of Reasons for Refusal for corresponding JP Application No. 2020-530131, 6 pages, dated Apr. 2, 2021.
Extended European Search Report for corresponding EP Application No. 19834006, 11 pages, dated Feb. 18, 2022.
Communication Pursuant to 94(3) for corresponding EP Application 19834066.9, 9 pages, dated Mar. 30, 2023.

* cited by examiner

INFORMATION PROCESSING APPARATUS AND CONTROL METHOD FOR CONTROLLER APPARATUS

TECHNICAL FIELD

The present invention relates to an information processing apparatus and a program.

BACKGROUND ART

In recent years, controller apparatuses that are used by being connected to an information processing apparatus such as a home-use game machine (apparatuses that include a joystick or the like and that receive a user's instruction operation and transmit the content of the instruction operation to the information processing apparatus) have been highly sophisticated in function, and thus can acquire information of analog values such as a switch push-in amount and a tilting operation amount with relatively high accuracy to provide the information to the information processing apparatus.

SUMMARY

Technical Problem

On such a background, it is desired to improve the quality of the experience using the controller apparatus by various processes using the information received from such a high-performance controller apparatus.

Solution to Problem

One aspect of the present invention that solves the problem of the above-mentioned conventional examples is an information processing apparatus to be connected to a controller apparatus including a push button that moves between a first position and a second position by being pushed by a user with a finger, and the information processing apparatus includes acquisition means for acquiring a push-in amount of the push button, determination means for determining whether or not the push-in amount is in a range that excludes the first position and the second position and that is set by two threshold values set between the first position and the second position, and process execution means for executing a predetermined process on the basis of the result of the determination.

Advantageous Effect of Invention

This can improve the quality of experience using the controller apparatus.

DESCRIPTION OF EMBODIMENT

Figure 1:
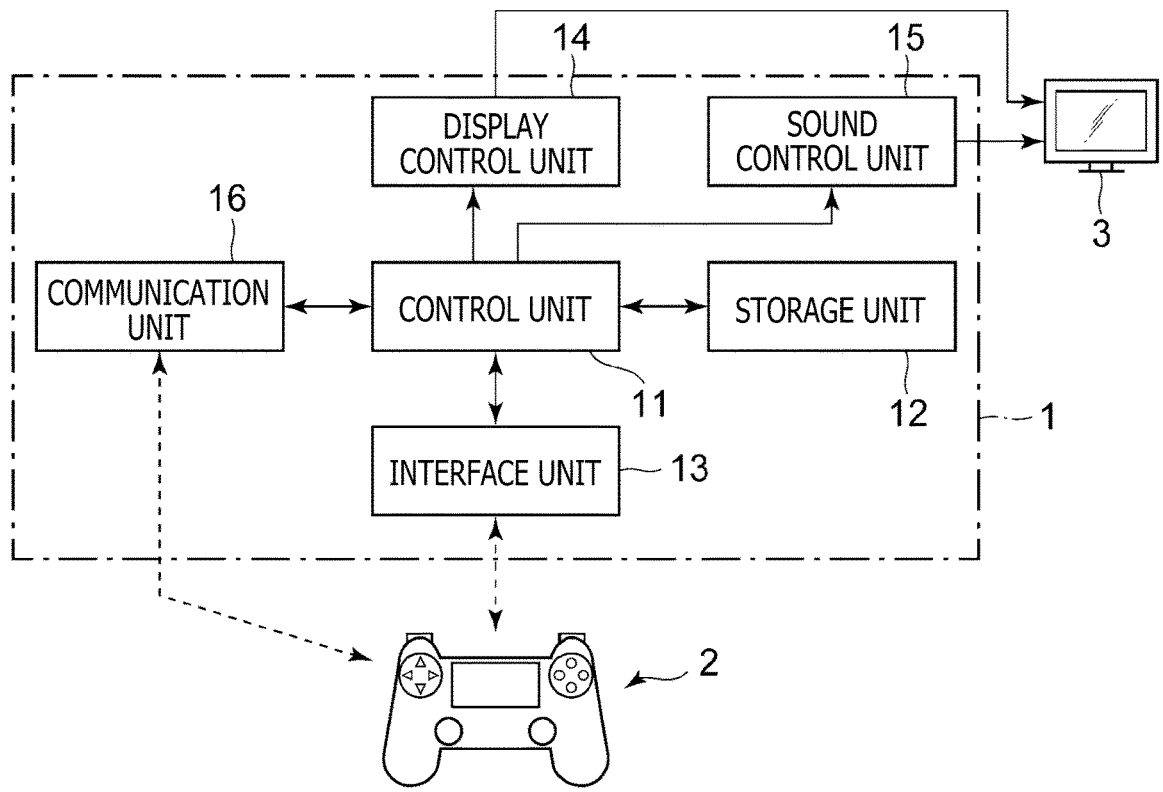
FIG. 1 is a block diagram illustrating a configuration example of an information processing apparatus according to an embodiment of the present invention.

An embodiment of the present invention will be described with reference to the drawings. As illustrated in FIG. 1, an information processing apparatus 1 according to an embodiment of the present invention includes a control unit 11, a storage unit 12, an interface unit 13, a display control unit 14, a sound control unit 15, and a communication unit 16. Further, the information processing apparatus 1 is connected to a controller apparatus 2 so as to be able to communicate by wire or wirelessly. Still further, a display apparatus 3 such as a display is connected to the information processing apparatus 1. In addition, the display apparatus 3 may include a speaker that outputs a sound.

Figure 2:
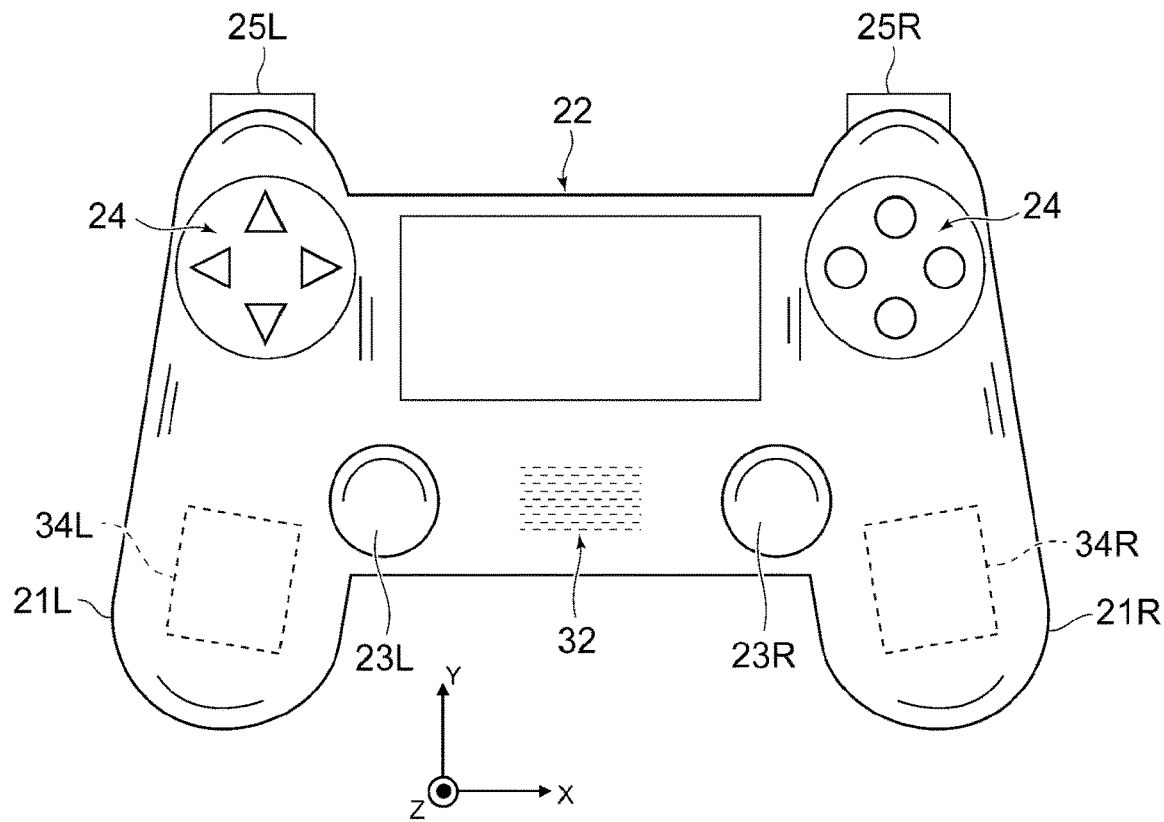
FIG. 2 is a schematic plan view illustrating an outline of a controller to be connected to the information processing apparatus according to the embodiment of the present invention.

As illustrated in FIG. 2, the controller apparatus 2 to be connected to the information processing apparatus 1 according to the present embodiment can be held by a user with both hands and includes grips 21L and 21R and a main body 22. Here, the grips 21L and 21R (hereinafter, in the case where both are collectively referred to, referred to as grips 21) are provided on the left and right sides of the housing, respectively, and when the user operates the controller apparatus 2 in a normal state, the grips are held with the left hand and the right hand, respectively. Further, joysticks 23L and 23R that can be tilted and a plurality of buttons 24 are arranged at positions where the thumbs of the left and right hands of the user reach on the main body 22 while the user holds the grips 21 with respective hands.

In addition, swing switches 25L and 25R are arranged on the back side surface of the main body 22 at positions where the index fingers or the middle fingers of the left and right hands of the user reach while the user holds the grips 21 with respective hands. Incidentally, in the following description, in the case where it is not necessary to distinguish the left and right configurations of each of the grips 21L and 21R, the joysticks 23L and 23R, and the swing switches 25L and 25R, the letters L and R will be omitted for representation, such as the swing switches 25, for example.

Here, the configurations and arrangements of these joysticks, buttons, and switches are examples, and the controller apparatus 2 may be further provided with other switches, buttons, and the like. Further, in the following description of the present embodiment, the sizes, ratios, arrangements, etc. of the controller apparatus 2 itself and each part such as the buttons thereof are examples, and the examples of the present embodiment are not limited to the sizes, ratios, and arrangements illustrated in the drawings.

Figure 3:
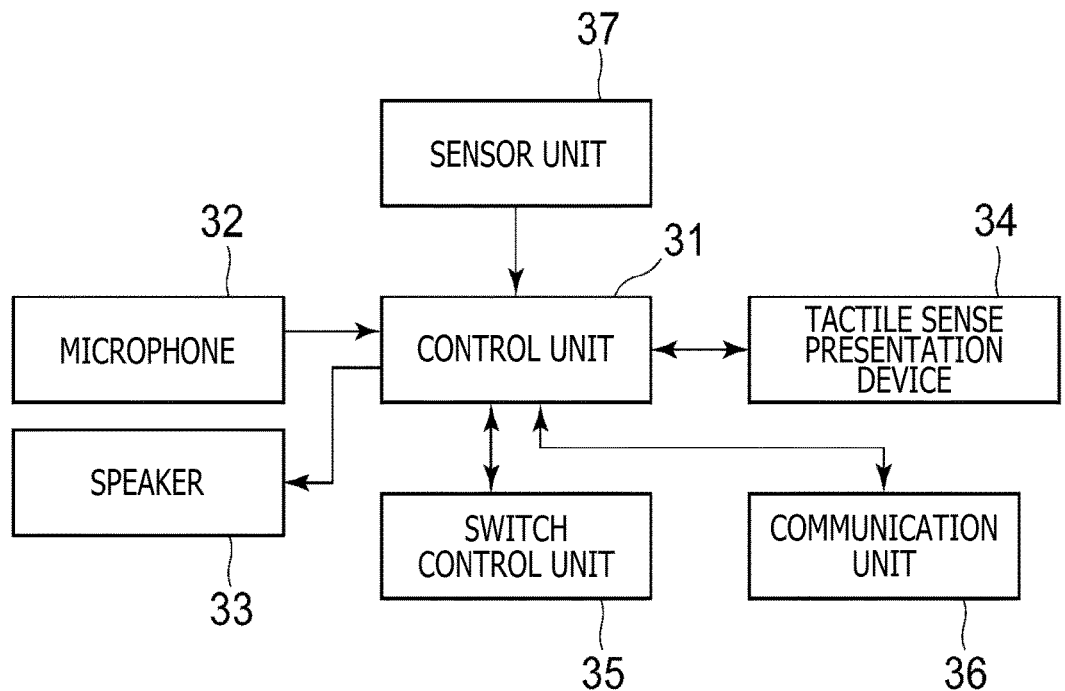
FIG. 3 is a configuration block diagram illustrating an example of a controller to be connected to the information processing apparatus according to the embodiment of the present invention.

Further, as illustrated in FIG. 3, a control unit 31, microphone 32, a speaker 33, a tactile sense presentation device 34, a switch control unit 35, a communication unit 36, and a sensor unit 37 are included inside the controller apparatus 2.

First, the configuration of each unit of the controller apparatus 2 will be described here. In the present embodiment, the swing switch 25 is fixed to the housing of the controller apparatus 2 via a shaft so as to be rotatable around the shaft within a predetermined angle range.

In the following description, this angle range is assumed to be a range of swinging between a first position where the outer surface of the swing switch 25 is protruded most outside the housing and a second position where the outer surface has been pushed into the housing.

Further, the swing switch 25 of the present embodiment may be a device capable of presenting a sense of force, for example. To be specific, on the shaft of the swing switch 25, a rotary encoder is provided as one of the sensors included in the sensor unit 37. This rotary encoder detects information regarding the swing position (push-in position) of the swing switch 25 and outputs the information to the control unit 31. In addition, a brake apparatus is arranged on the shaft of the swing switch 25 and brakes the rotation of the swing switch 25 according to an instruction input from the control unit 31. In the present embodiment, it is assumed that the braking force can also be controlled according to the instruction input from the control unit 31. As such a device, a structure widely known as a swing switch capable of presenting a force sense can be adopted, and therefore, a detailed description thereof will be omitted here. Further, the example of the present embodiment here is only an example, and the method of presenting the force sense of the swing switch 25 also may use an actuator or the like for controlling the movement of the swing switch 25 in a direction in which the switch is pushed out from the inside.

Further, in the following example of the present embodiment, the swing switch 25 is assumed to be biased toward the first position by an elastic body or the like. That is, the swing switch 25 is in the state of having been moved to the first position when not being operated by the user.

The control unit 31 of the controller apparatus 2 is a program control device such as a microcomputer and operates according to a program stored in a memory provided in the control unit 31. The control unit 31 of the present embodiment processes a sound signal input from the microphone 32 and causes the speaker 33 to sound in accordance with an instruction received from the information processing apparatus 1 or the like.

Further, the control unit 31 controls the tactile sense presentation device 34 according to an instruction received from the information processing apparatus 1 or the like, to present a tactile sense to the user. The control unit 31 controls the switch control unit 35 to present the reaction force against the push operation of the swing switch 25. Further, the control unit 31 acquires information indicating the content of the user's operation on the joysticks 23, the buttons 24, and the swing switches 25 (for example, the push-in amount of the swing switch 25 or the like) from the respective buttons, the sensor unit 37, and the like, and sends the acquired information to the information processing apparatus 1 via the communication unit 36. The operation of the control unit 31 will be described later in detail.

The microphone 32 generates a sound signal corresponding to the sound around the controller apparatus 2 and outputs the sound signal to the control unit 31. The speaker 33 sounds according to the sound waveform input from the control unit 31.

The tactile sense presentation device 34 is a voice coil motor (VCM), a vibrator, or the like, for example, and generates vibration of an waveform of an instruction according to the instruction input from the control unit 31, to present tactile sense such as vibration to the user holding the controller apparatus 2. The tactile sense presentation device 34 according to the present embodiment may be arranged in each of the grips 21L and 21R and may individually be controlled (illustrated as tactile sense presentation devices 34L and 34R in FIG. 2). By doing this, it is possible to present different tactile sense to each of the left and right hands.

The switch control unit 35 controls the force sense presentation device of the swing switch 25 and presents a reaction force against the pushing operation of the user (a force against the push-in).

The communication unit 36 is a USB (Universal Serial Bus), a network interface, a Bluetooth (registered trademark) interface, or the like, communicates with the information processing apparatus 1 in a wired or wireless manner, and receives an instruction or the like transmitted by the information processing apparatus 1, to output the received information to the control unit 31. Further, the communication unit 36 also sends the information regarding an instruction to the information processing apparatus 1 according to the instruction input from the control unit 31.

The sensor unit 37 includes at least one sensor. Here, the sensor may include a rotary encoder attached to the rotation shaft of the swing switch 25 as described above, for example. In addition, the sensor unit 37 may include an inclination sensor that detects the inclination of the controller apparatus 2 itself. With respect to the left-right direction of the controller apparatus 2 (X-axis direction), the direction from the front side to the far side (Y-axis direction), and the direction perpendicular to the plane extending along these X-axis and Y-axis (vertical direction: the Z axis direction), for example, this inclination sensor detects and outputs the rotation angles around the X, Y, and Z axes.

The control unit 11 of the information processing apparatus 1 is a program control device such as a CPU (Central Processing Unit) and operates according to a program stored in the storage unit 12. In the present embodiment, this program may be provided by being stored in a computer-readable and non-transitory recording medium and stored in the storage unit 12. A processing example of the control unit 11 of the present embodiment will be described later.

The storage unit 12 is a disk device, a memory device, or the like and holds a program to be executed by the control unit 11. The storage unit 12 also operates as a work memory for the control unit 11.

The interface unit 13 is a USB interface or the like and communicates with a device (controller apparatus 2 or the like) connected by a USB or the like, thereby sending out an instruction or data input from the control unit 11. Further, the interface unit 13 outputs the information received from the communication partner to the control unit 11.

The display control unit 14 draws an image according to an instruction input from the control unit 11 and outputs the drawn image to the display apparatus 3 for displaying. The sound control unit 15 generates a sound waveform according to an instruction input from the control unit 11 and outputs the sound waveform to a device such as the display apparatus 3 including a speaker, thereby producing a sound.

The communication unit 16 is a network interface, a Bluetooth (registered trademark) interface, or the like and communicates with a device (controller apparatus 2 or the like) wirelessly connected thereto, an external server, or the like, to send the instructions and data input from the control unit 11. Further, the communication unit 16 outputs the information received from the communication partner to the control unit 11.

Next, an operation example of the control unit 11 will be described. The control unit 11 of the present embodiment executes, for example, an application program of a game and operates as follows, for example.

[Push-in Amount of Swing Switch]

As a process of the application program, the control unit 11 according to the example of the present embodiment requires the user to keep at least one of the swing switches 25L and 25R of the controller apparatus 2 in a range (hereinafter referred to as an appropriate range) which excludes a first position (the position where the switch is protruded most outside the housing of the controller apparatus 2) and a second position (the position where the switch has been pushed to the end) and which is set by two threshold values set between the first position and the second position.

An example of such an application is considered to be a game application in which a game character climbs a vertical surface while holding a projecting portion serving as a handhold. In this game application, for example, the grasping force on the projecting portion is set by the swing switch 25, and the movement of the right and left hands (an action of extending one hand to the next projecting portion while grasping a projecting portion with the other hand) is carried out by tilting the joysticks 23. At this time, a setting is made so that in the case where the grasping force on the projecting portion is small (when the push-in amount is less than the threshold value L1), the game character falls down because the grasping force on the projecting portion is small, and on the other hand, when the grasping force is too large (the push-in amount is equal to or more than the threshold value L2), some projecting portions themselves collapse to also make the game character fall down.

Here, it is assumed that the threshold values L1 and L2 of the push-in amount satisfy L1<L2, and P1<L1 is satisfied with respect to the push-in amount P0 (set to "0") at the first position. Further, it is assumed that L2<Pmax is satisfied with respect to the push-in amount Pmax at the second position.

Note that L2 may be set differently for each projecting portion. Further, depending on the projecting portion, L2 may not be set (such that even when being grasped with the maximum grasping force, the projecting portion does not collapse). In this example, as the value of L2−L1 becomes smaller, the difficulty level of the operation becomes higher.

Further, in this example of the present embodiment, operability may be enhanced by presenting a tactile force sense. For example, when the push-in amount of the swing switch 25L exceeds the threshold value L1 or L2, the control unit 11 may output an instruction to the controller apparatus 2 to vibrate the tactile sense presentation device 34 built in the left-hand side grip 21L. Similarly, when the push-in amount of the swing switch 25R exceeds the threshold value L1 or L2, the control unit 11 may output an instruction to the controller apparatus 2 to vibrate the tactile sense presentation device 34 built in the right-hand side grip 21R. This allows the user to recognize that the user is holding a grip with each hand within the appropriate range.

Further, in addition to this vibration, when the push-in amount of the swing switch 25L is less than L1+ΔL (L1+ΔL<L2 is satisfied), for example, by use of a positive value ΔL of the push-in amount, the control unit 11 may output an instruction to the controller apparatus 2 to fractionally vibrate the tactile sense presentation device 34 built in the grip 21L on the left hand side (the same may be applied to the right hand side). According to this example, the user can recognize that the push-in amount is close to the lower limit of the appropriate range.

Further, in the present embodiment, the difficulty level can be adjusted by presenting a force sense with respect to the swing switch 25.

Figure 4:
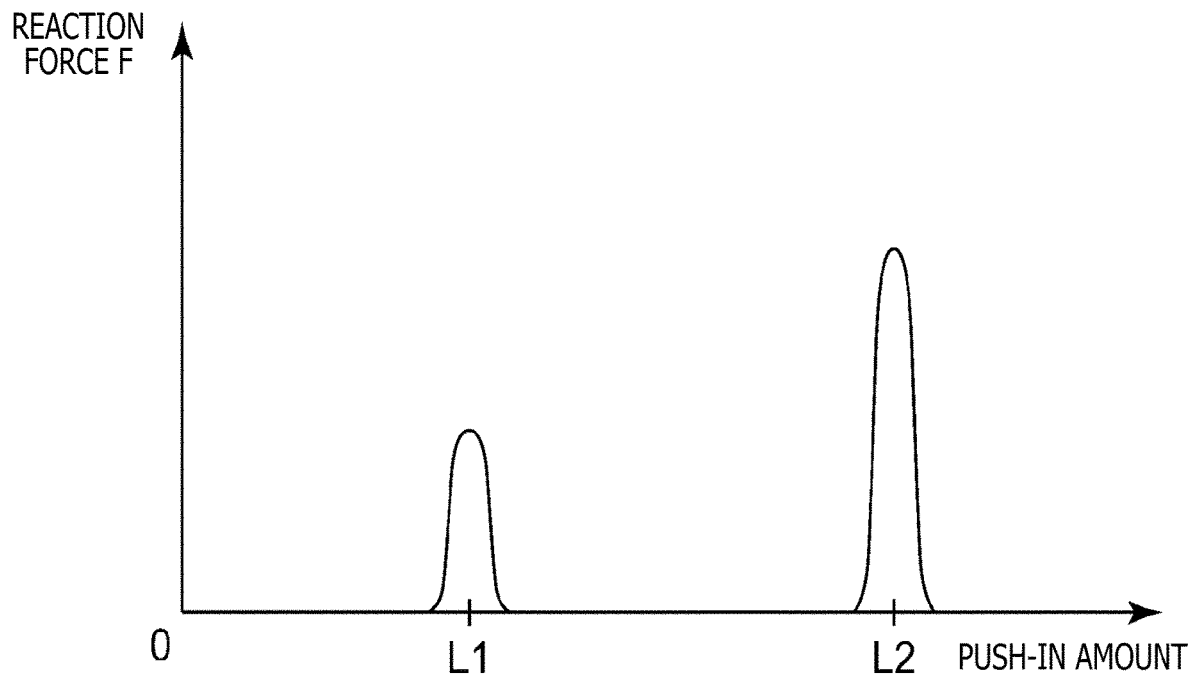
FIG. 4 is an explanatory diagram illustrating an example of control performed by the information processing apparatus according to the embodiment of the present invention.

For example, the control unit 11 may be set to present a reaction force relatively larger than the surroundings at the thresholds L1 and L2, for setting of the force sense with respect to the push-in amount (reaction force against the change in the push-in amount of the swing switch 25 (force against the change in the push-in amount) (FIG. 4).

In this way, when pushing the swing switch 25 from the initial position to reach the threshold value L1 for the first time, the user feels a reaction force, and when the threshold value L1 is exceeded, the user feels that the reaction force has disappeared. This makes it easy to understand that the threshold value L1 has been exceeded. Further, when continuously increasing the push-in amount, the user feels the reaction force again when the threshold value L2 is reached, and an operation that can cause the threshold value L2 to be exceeded can be prevented. At this time, if the warning in the case where the threshold L2 is exceeded is intended to be intensified, the magnitude of the reaction force presented near the threshold L2 may be set larger than the magnitude of the reaction force presented near the threshold L1, as illustrated in FIG. 4.

Further, in the case of a configuration in which the swing switch 25 can present the reaction force so as to prevent the decrease in the push-in amount also when decreasing the push-in amount from the push-in amount larger than the threshold value L1 (the pushing force of the swing switch 25 is reduced), such as in the case where the swing switch 25 has a brake on its rotation shaft, the control unit 11 presents a reaction force, and can resist the reduction of the force, when the push-in amount becomes close to the threshold value L1, by setting the reaction force as described above.

Further, in the case of a configuration in which the swing switch 25 cannot present the reaction force to prevent the decrease in the push-in amount (the reaction force can be presented only in the direction in which the push-in amount is reduced) when decreasing the push-in amount from the push-in amount larger than the threshold value L1 (the pushing force of the swing switch 25 is reduced), the control unit 11 checks the time variation of the push-in amount and may perform control so as not to present the reaction force regardless of the setting of the reaction force when the swing switch 25 reaches the threshold value L1 from the push-in amount larger than the threshold value L1.

As described above, in this example of the present embodiment, the difficulty level of the operation may be adjusted by dynamically changing the force required to change the push-in amount of the swing switch 25 (burden of the swing switch 25).

[Pushing Force of Swing Switch]

In another example, the control unit 11 according to the present embodiment causes the user to incline the controller apparatus 2 itself, to acquire the inclination from the output of the inclination sensor as the processing of the application program, and may change the inclination of an electric saw arranged in the game space according to the magnitude of the acquired inclination, so as to conduct processing to draw and display the image for the user.

At this time, the control unit 11 may set the rotation amount of the blade of the electric saw according to the push-in amount of the swing switch 25. The control unit 11 simulates an operation of cutting various objects such as virtual wood and stone materials arranged in the game space, according to these operations.

That is, the control unit 11 changes the presentation mode of the reaction force against the push-in of the swing switch 25 with respect to the magnitude of the rotation amount R (the push-in amount of the swing switch 25) of the blade of the electric saw, according to the type of the object to be cut. Further, the control unit 11 acquires information regarding the inclination of the controller apparatus 2 from the output of the inclination sensor. Then, the control unit 11 uses the acquired information to determine whether or not the blade of the electric saw is in contact with the virtual object at the position to be cut. In the present embodiment, in order to appropriately adjust the difficulty level of the game, the control unit 11 refers to only the angle θ around the X axis of the controller apparatus 2, for example, in the acquired inclination information, and compares the angle θ and the position of the virtual object (the uncut position when the cutting is proceeding halfway) to determine whether or not the blade of the electric saw is in contact with the virtual object at the position to be cut.

The control unit 11 that performs this process operates as follows, for example. Initially, the control unit 11 sets the position of the virtual object to be cut to the initial position φ=φ0 corresponding to the inclination (angle around the X axis) of the controller apparatus 2. Further, the control unit 11 sets the position where the cutting of the virtual object is completed as the position φE corresponding to the inclination (angle around the X axis) of the controller apparatus 2.

Further, the control unit 11 outputs, to the controller apparatus 2, waveform information that is determined in advance as waveform information when the electric saw is idling, as information regarding the vibration waveform of the tactile sense presentation device 34 of the controller apparatus 2. When the controller apparatus 2 controls the tactile sense presentation device 34 on the basis of this waveform information, the user recognizes from the vibration that the electric saw is operating but is not in contact with the object.

Further, the control unit 11 outputs waveform information determined in advance as the waveform information of the sound when the electric saw is idling to the display apparatus 3 for sounding.

The control unit 11 receives information regarding the inclination of the controller apparatus 2 (output of the inclination sensor) from the controller apparatus 2 and acquires the angle θ around the X axis of the controller apparatus 2 from the information regarding the inclination.

The control unit 11 determines whether or not θ≥φ is satisfied (whether the saw is in contact with the cutting position of the object), and if it is determined that the saw is not in contact with the cutting position of the object, the control unit 11 changes the inclination of the image of the electric saw in the displayed image according to the acquired angle θ and returns the processing to the process of acquiring the inclination information of the controller apparatus 2 to continue the processing.

On the other hand, when it is determined here that the saw has come into contact with the cutting position of the object (θ≥φ is satisfied), the control unit 11 performs the following process. That is, the control unit 11 obtains the cutting amount Δφ as follows, for example.
Δφ=P[α·(R−R0)·(φ−θ)] Here, it is assumed that P[X] is a function that represents X when X>0 is satisfied and represents zero when X≤0 is satisfied. Further, R represents the push-in amount of the swing switch 25, R0 represents the reference push-in amount set by the control unit 11 for each object to be cut, and α is a positive proportional parameter set by the control unit 11 for each object to be cut. As a result, the virtual object will not be cut unless the user inclines the controller apparatus 2 with the swing switch 25 pushed in with a push-in amount exceeding the reference push-in amount.

The control unit 11 determines whether or not Δφ is zero (whether the object is not cut), and when Δφ is zero, the control unit 11 instructs the controller apparatus 2 to stop the tactile sense presenting operation of the tactile sense presentation device 34 of the controller apparatus 2 while maintaining the inclination of the image of the electric saw in the image to be displayed at the inclination currently displayed, and further stops the output of the sound corresponding to the rotation of the electric saw.

This allows the user to recognize that the electric saw has stopped rotation due to the object because,
 although the controller apparatus 2 has been inclined, the inclination of the electric saw that is the operation object on the screen does not change,
 tactile sense presentation has been stopped, and
 sound has been cut off.

The control unit 11 further returns to the process of acquiring the inclination information of the controller apparatus 2 and continues the process.

Further, when it is determined whether or not Δφ is zero, and in the case of Δφ>0, the control unit 11 inclines the image of the electric saw in the image to be displayed at an angle of β·θ. Here, β is a positive real number satisfying 0<β<1 and is preset by the control unit 11 for each type of virtual object. This β is one of the attribute information related to the virtual object.

The control unit 11 also updates the new cutting position to φ+Δφ by using the value φ representing the current cutting position (set φ←φ+ΔO. The control unit 11 determines whether or not the cutting position φ updated here satisfies φ>φE, and when it is determined that φ>φE is satisfied, the control unit 11 displays an image giving a notice to the effect that the cutting has been completed, and then ends the process. At this time, the control unit 11 may output, to the controller apparatus 2, waveform information determined in advance as the waveform information when the electric saw is idling, as the information of the vibration waveform of the tactile sense presentation device 34 of the controller apparatus 2. In addition, the control unit 11 may output waveform information determined in advance as the waveform information of the sound when the electric saw is idling to the display apparatus 3 in order to cause the display apparatus 3 to sound.

Further, if the cutting position φ after updating does not satisfy φ>φE, the control unit 11 outputs, to the controller apparatus 2, the waveform information determined in advance as the waveform information when the electric saw is cutting, as the information of the vibration waveform of the tactile sense presentation device 34 of the controller apparatus 2. Then, the controller apparatus 2 is caused to control the tactile sense presentation device 34 by this waveform information. This waveform information may also be determined in advance for each type of virtual object.

The control unit 11 also outputs waveform information determined in advance as the waveform information of the sound during cutting to the display apparatus 3 for sounding. This sound waveform information may also be determined in advance for each type of virtual object.

Further, at this time, the control unit 11 may cause the swing switch 25 being pushed down by the user to present a reaction force corresponding to the amount of push-in of the swing switch 25. The control unit 11 determines the magnitude of the reaction force by a method determined in advance such as γ·R, by using the push-in amount R and the parameter γ determined in advance for each virtual object to be cut, while the virtual electric saw is in contact with the cutting position of the object (θ≥φ and φ≤φE) by the user's operation, and presents the reaction force against the pushing of the swing switch 25.

The control unit 11 then returns to the process of acquiring the information regarding the inclination of the controller apparatus 2 and continues the process.

By the operation of the control unit 11, the user senses the reaction force against the pushing of the swing switch 25 while cutting and also recognizes by the vibration and sound that the cutting is performed. For example, in the case where an actuator or the like that controls the movement of the swing switch 25 in the direction of pushing out the swing switch 25 from the inside is used as a method of presenting the force sense of the swing switch 25, even if the push-in amount R of the swing switch 25 is constant, when the inclination information θ of the controller apparatus 2 (output of the inclination sensor) is in the range of θ≥φ and φ≤φE, a predetermined reaction force is presented (for example, the actuator is controlled to move the switch in the direction toward the position R' where the push-in amount is smaller than the pushing position R and the user is presented with a reaction force against the pushing).

In this way, when the game state changes, even when the amount of push-in of the swing switch 25 is kept constant, by the user performing other operations (inclining the controller apparatus 2, operating the joysticks 23 or the buttons 24, etc.) or the like (or even performing no special operations), the user can grasp the state of the game by the change of the reaction force presented to the user by the swing switch 25 (difficulty in push-in or moving force in the direction opposite to the pushing direction).

Further, for example, if the value β is set to be smaller in the case of a stone material than in the case of wood, the change in the angle of the electric saw in the image with respect to the change in the inclination of the controller apparatus 2 becomes smaller, so that the user is given the feeling of cutting an object more difficult to cut.

Similarly, the value α is decreased and the value γ is increased for objects more difficult to cut. This makes it possible to reduce the amount of cutting per unit time when the amount of rotation (the push-in amount of the swing switch 25) is the same, thereby giving the user a feeling that cutting is more difficult. Further, the reaction force is increased by increasing the value γ, and the user is given the feeling of cutting an object difficult to cut.

Thus, in this example of the present embodiment, by changing the burden (reaction force) of the swing switch 25, presented sense of touch, sound, and amount of change in the image corresponding to the magnitude of the operation, according to the object displayed in the game space, the texture (hardness etc.) and massive feeling of the object, or attributes such as offensive strength and defensive strength are comprehensively presented to the user.

Further, the control unit 11 may differ the waveform information for controlling the tactile sense presentation device 34 or waveform information output as a sound, which is output to the controller apparatus 2, according to the information regarding the inclination of the controller apparatus 2 acquired from the controller apparatus 2.

As an example, as the inclination of the controller apparatus 2 around the X axis increases from the horizontal (such as having an angle closer to the perpendicular), the frequency of each waveform information of the waveform information controlling the tactile sense presentation device 34 and the waveform information of the sound may be controlled to be high.

In this way, when the throttle of the motorcycle is turned, the user can feel as if the amount of rotation of the engine has increased.

REFERENCE SIGNS LIST

1 Information processing apparatus, 2 Controller apparatus, 3 Display apparatus, 11 Control unit, 12 Storage unit, 13 Interface unit, 14 Display control unit, 15 Sound control unit, 16 Communication unit, 21 Grip, 22 Main body, 23 Joystick, 24 Button, 25 Swing switch, 31 Control unit, 32 Microphone, 33 Speaker, 34 Tactile sense presentation device, 35 Switch control unit, 36 Communication unit, 37 Sensor unit

The invention claimed is:

1. An information processing apparatus to be connected to a controller apparatus including a push button that moves between a first position and a second position by being pushed by a user with a finger, the information processing apparatus comprising:
   a processor operating to execute computer executable software, which causes the processor to carry out actions, including:
   acquiring a push-in amount of the push button;
   determining whether or not the push-in amount is in a range that excludes the first position and the second position and that is set by two threshold values set between the first position and the second position; and
   executing a predetermined process, based on a result of the determination, wherein:
   as the predetermined process, when the push-in amount is in the range set by the two threshold values, a determination is made that a game character is grasping a target, and when the push-in amount is not in the range set by the two threshold values, the information processing apparatus executes a process, based on a determination that the game character has currently been unable to grasp the target,
   the controller apparatus includes an inclination sensor,
   the processor further carries out the action of generating image information to be presented to the user,
   the acquiring includes acquiring information regarding inclination of the controller apparatus detected by the inclination sensor, and
   the executing includes controlling information regarding an inclination angle of an object with respect to the acquired information regarding the inclination, according to attribute information regarding the object determined by a predetermined method, the control being a process of setting, based on the information regarding the inclination, the inclination angle of the object indicated in the image information.

2. The information processing apparatus according to claim 1, wherein the object is a blade that cuts a virtual target in a game space, and based on the information regarding the inclination angle, the information processing apparatus determines whether or not the blade is in contact with a position where the virtual target should be cut, and when determining that the blade is in contact with the position, the information processing apparatus determines a cutting amount of the virtual target, based on the push-in amount of the push button.

3. The information processing apparatus according to claim 2, wherein, when the information processing apparatus determines that the blade is in contact with the position where the virtual target should be cut, and when the push-in amount of the push button does not exceed a reference push-in amount determined in advance, the information processing apparatus determines the cutting amount of the virtual target to be "0".

4. The information processing apparatus according to claim 2, wherein the information processing apparatus updates and displays a position of the blade in the game space, based on the determined cutting amount.

5. The information processing apparatus according to claim 1, wherein:
the processor further carries out the action of presenting sound information to the user, and
the executing includes controlling sound information with respect to the acquired information regarding the inclination, according to the attribute information regarding the object determined by the predetermined method.

6. A method for controlling a controller apparatus that causes an information processing apparatus that is to be connected to the controller apparatus including a push button that moves between a first position and a second position by being pushed by a user with a finger, to execute:
acquiring a push-in amount of the push button by an acquisition unit of the information processing apparatus;
determining, by a determination unit, whether or not the push-in amount is in a range that excludes the first position and the second position and that is set by two threshold values set between the first position and the second position; and
executing, by a process executing unit, a predetermined process, based on a result of the determination, wherein:
as the predetermined process, when the push-in amount is in the range set by the two threshold values, a determination is made that a game character is grasping a target, and when the push-in amount is not in the range set by the two threshold values, the information processing apparatus executes a process, based on a determination that the game character has currently been unable to grasp the target,
the controller apparatus includes an inclination sensor,
the method includes generating image information to be presented to the user,
the acquiring includes acquiring information regarding inclination of the controller apparatus detected by the inclination sensor, and
the executing includes controlling information regarding an inclination angle of an object with respect to the acquired information regarding the inclination, according to attribute information regarding the object determined by a predetermined method, the control being a process of setting, based on the information regarding the inclination, the inclination angle of the object indicated in the image information.

* * * * *